United States Patent
Goodenough et al.

(10) Patent No.: US 7,897,071 B2
(45) Date of Patent: Mar. 1, 2011

(54) SYSTEMS AND METHODS FOR PRODUCING SILICONE HYDROGEL CONTACT LENSES

(75) Inventors: Neil G. Goodenough, Southampton (GB); Gregg A. Dean, Southampton (GB); Sarah E. Darnton, Southampton (GB); Richard C. Rogers, Chandler's Ford (GB); Philip A. Brame, Southampton (GB); Geoffrey A. Blyth, Southampton (GB); Eve Blyth, legal representative, Southampton (GB); Sarah L. Almond, Eastleigh (GB); Ian Bruce, Southampton (GB); Pete Coldrey, Southampton (GB); Jamie Snell, Southampton (GB)

(73) Assignee: CooperVision International Holding Company, LP, St. Michael (BB)

( * ) Notice: Subject to any disclaimer, the term of this patent is extended or adjusted under 35 U.S.C. 154(b) by 0 days.

(21) Appl. No.: 12/830,735

(22) Filed: Jul. 6, 2010

(65) Prior Publication Data

US 2010/0270693 A1 Oct. 28, 2010

Related U.S. Application Data

(63) Continuation of application No. 11/201,409, filed on Aug. 9, 2005, now Pat. No. 7,799,249.

(51) Int. Cl.
*B29D 11/00* (2006.01)
*B29C 33/00* (2006.01)

(52) U.S. Cl. .................. 264/1.38; 264/2.5; 264/2.6; 264/334

(58) Field of Classification Search ............... 264/1.38, 264/2.5, 2.6, 334
See application file for complete search history.

(56) References Cited

U.S. PATENT DOCUMENTS

| | | | |
|---|---|---|---|
| 3,935,291 A | 1/1976 | Jackson | |
| 4,592,887 A | 6/1986 | Bando et al. | |
| 4,761,069 A | 8/1988 | Truong et al. | |
| 4,868,397 A | 9/1989 | Tittel | |
| 4,872,405 A | 10/1989 | Sterman | |

(Continued)

FOREIGN PATENT DOCUMENTS

| | | |
|---|---|---|
| EP | 0 908 476 A2 | 4/1999 |
| JP | 64-084219 | 3/1989 |
| JP | 5-337957 | 12/1993 |
| JP | 11-320699 | 11/1999 |
| JP | 2000-162555 | 6/2000 |

(Continued)

OTHER PUBLICATIONS

U.S. Appl. No. 11/200,848, filed Aug. 9, 2005.

(Continued)

*Primary Examiner*—Richard Crispino
*Assistant Examiner*—Robert Dye
(74) *Attorney, Agent, or Firm*—Stout, Uxa, Buyan & Mullins; Frank J. Uxa

(57) ABSTRACT

Systems and methods for producing silicone hydrogel contact lenses are described. Certain of the present systems include a contact lens mold forming station, a station for filling a contact lens mold section with a lens precursor composition and for placing a second mold section on the filled mold section to form a contact lens mold assembly, a curing station for forming a contact lens, a mold assembly separation station, and an extraction/hydration station. Certain of the present methods include forming a plurality of mold sections, placing a lens precursor composition on a surface of a first mold section, placing a second mold section on the first mold section, polymerizing the lens precursor composition, separating the first and second mold sections, removing the silicone hydrogel contact lens from one of the mold sections, extracting extractable components from the contact lens, and hydrating the contact lens.

21 Claims, 6 Drawing Sheets

U.S. PATENT DOCUMENTS

| | | | |
|---|---|---|---|
| 5,036,971 A | 8/1991 | Seden et al. | |
| 5,080,839 A | 1/1992 | Kindt-Larsen | |
| 5,094,609 A | 3/1992 | Kindt-Larsen | |
| 5,114,455 A | 5/1992 | Hirota et al. | |
| 5,120,499 A | 6/1992 | Baron | |
| 5,144,144 A | 9/1992 | Borovsky | |
| 5,158,718 A | 10/1992 | Thakrar et al. | |
| 5,204,126 A | 4/1993 | Singh et al. | |
| 5,252,056 A | 10/1993 | Hörner et al. | |
| 5,292,350 A | 3/1994 | Molock et al. | |
| 5,294,379 A | 3/1994 | Ross et al. | |
| 5,407,627 A | 4/1995 | Schiller et al. | |
| 5,488,815 A | 2/1996 | Abrams et al. | |
| 5,540,410 A | 7/1996 | Lust et al. | |
| 5,573,108 A | 11/1996 | Hamilton et al. | |
| 5,593,620 A | 1/1997 | Galas | |
| 5,597,519 A | 1/1997 | Martin et al. | |
| 5,640,980 A | 6/1997 | Keene et al. | |
| 5,648,024 A | 7/1997 | Galas | |
| 5,687,541 A | 11/1997 | Martin et al. | |
| 5,690,866 A | 11/1997 | Andersen et al. | |
| 5,693,268 A * | 12/1997 | Widman et al. | 264/1.1 |
| 5,704,468 A | 1/1998 | Lust et al. | |
| 5,749,205 A | 5/1998 | Edwards et al. | |
| 5,759,318 A | 6/1998 | Galas | |
| 5,762,081 A | 6/1998 | Keene et al. | |
| 5,804,107 A | 9/1998 | Martin et al. | |
| 5,814,134 A | 9/1998 | Edwards et al. | |
| 5,820,895 A | 10/1998 | Widman et al. | |
| 5,836,323 A | 11/1998 | Keene et al. | |
| 5,849,209 A | 12/1998 | Kindt-Larsen et al. | |
| 5,849,222 A | 12/1998 | Jen et al. | |
| 5,850,107 A | 12/1998 | Kindt-Larsen et al. | |
| 5,882,698 A | 3/1999 | Su et al. | |
| 5,894,002 A | 4/1999 | Boneberger et al. | |
| 5,895,192 A | 4/1999 | Parnell, Sr. et al. | |
| 5,935,492 A | 8/1999 | Martin et al. | |
| 5,965,172 A | 10/1999 | Wang et al. | |
| 6,033,603 A | 3/2000 | Lesczynski et al. | |
| 6,039,899 A | 3/2000 | Martin et al. | |
| 6,071,440 A | 6/2000 | Wang et al. | |
| 6,113,817 A | 9/2000 | Herbrechtsmeier et al. | |
| 6,149,842 A | 11/2000 | Lally et al. | |
| 6,180,032 B1 | 1/2001 | Parnell, Sr. et al. | |
| 6,183,705 B1 | 2/2001 | Chang | |
| 6,193,369 B1 * | 2/2001 | Valint et al. | 351/160 H |
| 6,257,547 B1 | 7/2001 | Togo et al. | |
| 6,288,852 B1 | 9/2001 | Cameron | |
| 6,310,116 B1 | 10/2001 | Yasuda et al. | |
| 6,315,929 B1 | 11/2001 | Ishihara et al. | |
| 6,359,024 B2 | 3/2002 | Lai | |
| 6,364,934 B1 | 4/2002 | Nandu et al. | |
| 6,405,993 B1 | 6/2002 | Morris | |
| 6,428,723 B1 | 8/2002 | Lesczynski et al. | |
| 6,432,217 B1 | 8/2002 | Baxter et al. | |
| 6,444,145 B1 | 9/2002 | Clutterbuck | |
| 6,465,538 B2 | 10/2002 | Lai | |
| 6,475,410 B1 | 11/2002 | Nakagawa | |
| 6,511,617 B1 | 1/2003 | Martin et al. | |
| 6,531,432 B2 | 3/2003 | Molock et al. | |
| 6,551,531 B1 | 4/2003 | Ford et al. | |
| 6,565,776 B1 | 5/2003 | Li et al. | |
| 6,592,356 B1 | 7/2003 | Lust et al. | |
| 6,627,124 B1 | 9/2003 | Herbrechtsmeier et al. | |
| 6,638,362 B2 | 10/2003 | Dobner et al. | |
| 6,638,451 B1 | 10/2003 | Hagmann et al. | |
| 6,708,397 B2 | 3/2004 | Parnell, Sr. et al. | |
| 6,719,929 B2 | 4/2004 | Winterton et al. | |
| 6,790,873 B2 | 9/2004 | Tomono et al. | |
| 6,867,245 B2 | 3/2005 | Iwata et al. | |
| 2002/0016383 A1 * | 2/2002 | Iwata et al. | 523/106 |
| 2002/0020634 A1 | 2/2002 | Fortune | |
| 2002/0046958 A1 | 4/2002 | Lipscomb et al. | |
| 2002/0137811 A1 | 9/2002 | Turek et al. | |
| 2002/0163619 A1 | 11/2002 | Matsuzawa et al. | |
| 2002/0185763 A1 | 12/2002 | Pegram et al. | |
| 2003/0000028 A1 | 1/2003 | Molock et al. | |
| 2003/0031746 A1 | 2/2003 | Calvin et al. | |
| 2003/0049346 A1 | 3/2003 | Calvin et al. | |
| 2003/0062640 A1 | 4/2003 | Ansell et al. | |
| 2003/0090014 A1 | 5/2003 | Heinrich et al. | |
| 2003/0108637 A1 | 6/2003 | O'Dunlaing et al. | |
| 2003/0125498 A1 | 7/2003 | McCabe et al. | |
| 2003/0134132 A1 | 7/2003 | Winterton et al. | |
| 2003/0160343 A1 | 8/2003 | Hodgkinson | |
| 2003/0164562 A1 | 9/2003 | Li et al. | |
| 2003/0164563 A1 | 9/2003 | Calvin et al. | |
| 2003/0197833 A1 | 10/2003 | Hiratani et al. | |
| 2003/0203066 A1 | 10/2003 | Lust et al. | |
| 2003/0222362 A1 | 12/2003 | Indra et al. | |
| 2004/0000732 A1 | 1/2004 | Spaulding et al. | |
| 2004/0031701 A1 | 2/2004 | Peck et al. | |
| 2004/0074525 A1 | 4/2004 | Widman et al. | |
| 2004/0075039 A1 | 4/2004 | Dubey et al. | |
| 2004/0075182 A1 * | 4/2004 | Gobron | 264/2.5 |
| 2004/0075807 A1 | 4/2004 | Ho et al. | |
| 2005/0171232 A1 | 8/2005 | Ford et al. | |
| 2006/0097415 A1 | 5/2006 | Watterson et al. | |

FOREIGN PATENT DOCUMENTS

| | | |
|---|---|---|
| JP | 2002-137230 | 5/2002 |
| JP | A-2004-268596 | 9/2004 |
| WO | WO 01/15497 A1 | 3/2001 |
| WO | WO01/23066 | 4/2001 |
| WO | WO03/011551 | 2/2003 |
| WO | WO2004/056555 | 7/2003 |

OTHER PUBLICATIONS

U.S. Appl. No. 11/200,648, filed Aug. 9, 2005.
U.S. Appl. No. 11/200,644, filed Aug. 9, 2005.
U.S. Appl. No. 11/201,410, filed Aug. 9, 2005.
U.S. Appl. No. 11/200,863, filed Aug. 9, 2005.
U.S. Appl. No. 11/200,862, filed Aug. 9, 2005.
PCT International Search Report dated Jan. 17, 2008 in related PCT Application No. PCT/US06/30498.
USPTO Office Action dated Sep. 17, 2008 in parent U.S. Appl. No. 11/201,409, filed Aug. 9, 2005.
USPTO Office Action dated Mar. 3, 2009 in parent U.S. Appl. No. 11/201,409, filed Aug. 9, 2005.
USPTO Office Action dated Jul. 16, 2009 in parent U.S. Appl. No. 11/201,409, filed Aug. 9, 2005.
USPTO Office Action dated Feb. 18, 2010 in parent U.S. Appl. No. 11/201,409, filed Aug. 9, 2005.
USPTO Advisory Action dated May 3, 2010 in parent U.S. Appl. No. 11/201,409, filed Aug. 9, 2005.
English Abstract and a computer translation of JP-A-2004-268596.

* cited by examiner

SYSTEMS AND METHODS FOR PRODUCING SILICONE HYDROGEL CONTACT LENSES

CROSS-REFERENCE TO RELATED APPLICATIONS

This application is a continuation of U.S. application Ser. No. 11/201,409, filed Aug. 9, 2005, the disclosure of which is hereby incorporated in its entirety herein by this reference.

BACKGROUND OF THE INVENTION

The present invention relates to silicone hydrogel contact lenses and the production thereof. More particularly, the present invention relates to systems and methods for producing silicone hydrogel contact lenses.

Soft contact lenses can be produced in plastic contact lens mold assemblies by polymerizing lens precursor compositions in the contact lens mold assemblies. Existing contact lens mold assemblies comprise a first mold section and a second mold section. Each mold section has a single surface that corresponds to a surface of a soft contact lens having an optically acceptable quality. When mold sections formed from polypropylene or other similar materials are used to form mold assemblies, the assemblies are formed from an interference fit between the first and second mold sections.

A lens precursor composition contained in the mold assembly can be polymerized to form a contact lens located in a lens shaped cavity of the mold assembly. For example, a lens precursor composition can be exposed to ultraviolet light to polymerize the composition. The light delivered to the lens precursor composition is usually not uniformly or constantly applied to the mold assemblies since light-emitting lamps are located on only one side of the mold assemblies. To address this issue, the light emitted from the lamps is delivered at high intensities. However, the light is still not uniform or constant.

After polymerizing the lens precursor composition, the mold sections are separated by breaking the interference fit between the two mold sections. Unreacted monomers and the like can be extracted, and the lens can be packaged. For silicone hydrogel contact lenses, the extraction process often requires the lens to be contacted with an organic solvent. After a period of time, when the solvent has become contaminated with the unreacted monomers, the solvent is discarded.

In addition, since a silicone hydrogel contact lens formed in a polypropylene mold or other mold formed from similar materials has surfaces with insufficient wettability characteristics required for ophthalmic use, the silicone hydrogel contact lens undergoes a surface treatment or surface modification to enhance the wettability of the lens surfaces.

Thus, there remains a need for improved systems and methods for producing silicone hydrogel contact lenses that reduce manufacturing time, manufacturing costs, and/or produce large quantities of silicone hydrogel contact lenses that are ophthalmically acceptable and provide vision enhancement with little or no negative side effects.

SUMMARY OF THE INVENTION

The present systems and methods address this need and are used to produce silicone hydrogel contact lenses, such as extended wear contact lenses. The present systems and methods form a plurality of substantially identically structured mold sections that have two optical quality surfaces in a lens forming region of the mold sections. A lens precursor composition is placed on one surface of a mold section. A second mold section is placed over the mold section containing the lens precursor composition to form a lens shaped cavity with the composition located therein. The resulting contact lens mold assembly and the lens precursor composition are exposed to a polymerizing agent, such as ultraviolet light, to form a silicone hydrogel contact lens located in the lens shaped cavity. The mold sections are separated and the lens is removed from one mold section, and is contacted by an extraction medium to remove extractable components from the lens. The lens is then hydrated to form a swelled silicone hydrogel contact lens. Optionally, the swelled lens can be inspected and packaged for distribution.

Each and every feature described herein, and each and every combination of two or more of such features, is included within the scope of the present invention provided that the features included in such a combination are not mutually inconsistent. In addition, any feature or combination of features may be specifically excluded from any embodiment of the present invention.

These and other aspects of the present invention are apparent in the following detailed description and claims, particularly when considered in conjunction with the accompanying drawings in which like parts bear like reference numerals.

DETAILED DESCRIPTION

Systems and methods for producing silicone hydrogel contact lenses have been invented. As used herein, a silicone hydrogel contact lens is a contact lens that has a high oxygen permeability and an ophthalmically acceptable water content. Silicone hydrogel contact lenses can be understood to be contact lenses that comprise a silicone hydrogel material. For example, silicone hydrogel contact lenses can comprise one or more hydrophilic silicon-containing macromers. Examples of suitable materials used to make silicone hydrogel contact lenses include, without limitation, galifilcon A, senofilcon A, lotrifilcon A, lotrifilcon B, or balifilcon A. Additional examples of materials used to make the present silicone hydrogel contact lenses include those materials disclosed in U.S. Pat. No. 6,867,245.

The lenses produced using the present systems and methods can be understood to be extended wear contact lenses. For example, the lenses can be worn by a person continuously for more than one day (e.g., 24 hours) without undue discomfort or damage to the eye. Certain lenses can be worn for at least five days, for example for about one or two weeks, or for about thirty days or more.

The present systems and methods are preferably automated and are configured to produce large amounts of contact lenses in reasonably acceptable amounts of time.

Figure 1:
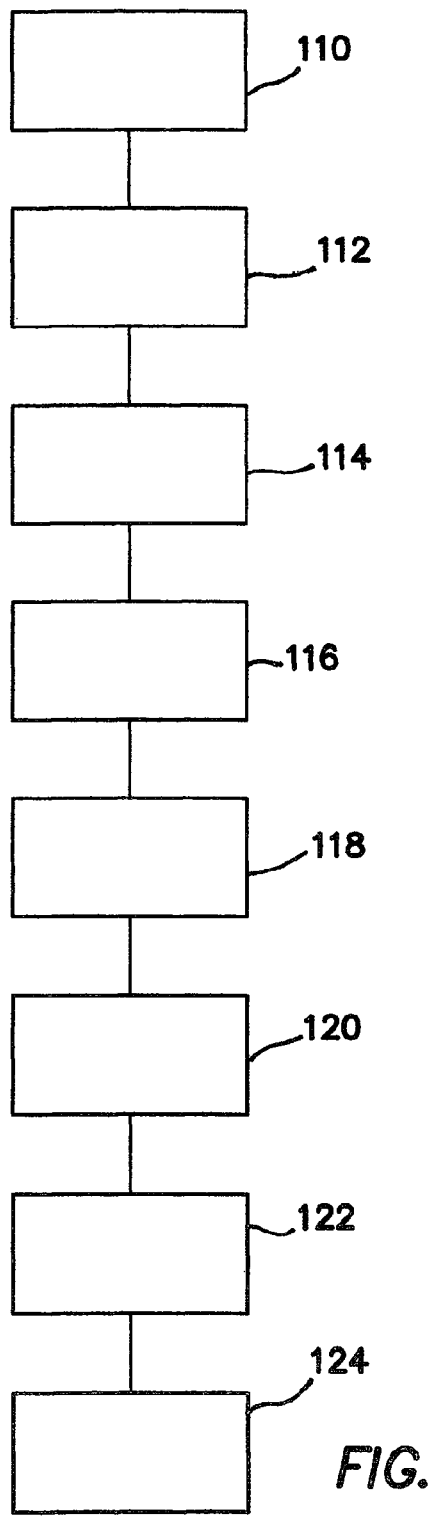
FIG. 1 is a flow chart of one embodiment of the present methods.

As shown in FIG. 1, a method for producing a silicone hydrogel contact lens in accordance with the disclosure herein comprises multiple steps.

One of the present methods comprises a step 110 of forming a plurality of contact lens mold sections. Each mold section is substantially identical to the other mold section for a given lot of mold sections. Thus, a batch of mold sections can be produced that are all substantially identical in structure. Each mold section comprises a lens forming region. The lens forming region comprises a concave surface which is a negative of an optical quality anterior surface of a contact lens, and a convex surface which is a negative of an optical quality posterior surface of a contact lens.

Figure 3:
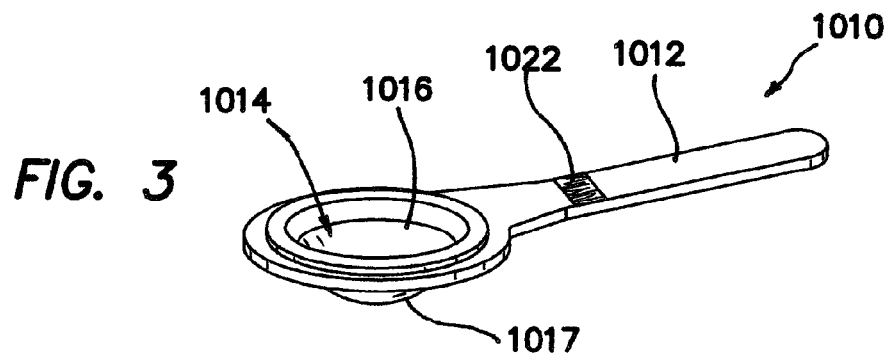
FIG. 3 is a perspective view of a mold section to produce silicone hydrogel contact lenses.

An example of a mold section produced using the present methods and systems is illustrated in FIG. 3. As shown in FIG. 3, the mold section 1010 comprises a lens forming region 1014 having a concave surface 1016 and an opposing convex surface 1017. As used herein, an optical quality surface refers to a lens-defining surface that has a smoothness effective to impart a high quality optically smooth surface to a lens product molded therefrom. Thus, each of the present mold sections comprises two surfaces that produce contact lenses with smooth ophthalmically acceptable surfaces. In certain terms, the present mold sections can be understood to be universal mold sections.

In certain embodiments, eight mold sections can be produced at a time or in a single step. The eight mold sections can then be transferred to a tray which can hold a total of five hundred twelve substantially identical mold sections.

In the illustrated embodiment, which is provided by way of example and not by way of limitation, the method may comprise an optional step of forming an elongate member 1012 on the mold sections 1010, as shown in FIG. 3. In the preferred method, the elongate member 1012 and the lens forming region 1014 are integrally formed as a unitary mold section. For example, both portions are formed during a single injection molding step. In one embodiment, the forming of the mold sections of the present methods comprises injection molding an ethylene-vinyl alcohol (EVOH) polymer based material into a contact lens mold-shaped cavity. Other similar polymeric materials, such as other materials that form a silicone hydrogel lens with wettable surfaces, can be used to form the mold sections. As understood by persons of ordinary skill in the art, the cavity is typically the negative of the contact lens mold section 1010 shown in FIG. 3.

The lens forming region 1014 of the mold section 1010 can be formed using two optical inserts, each insert having a smooth surface sufficient for forming an optical quality surface of the mold section, as discussed herein. Each insert can be provided in a plate used to form the mold cavity. The shape of the smooth surface of the optical inserts imparts certain design features to the present contact lenses, such as optical power, and the like. Thus, different batches of mold sections can be produced by replacing the optical inserts in the plates with different optical inserts. One advantage of producing substantially identically structured mold sections, such as mold sections having two optical quality surfaces, is that the systems comprise a reduced number of components or parts, a reduced number of molding machines, and/or enhancements in inventory management relative to existing systems which form mold sections that have only one optical quality surface.

Figure 4:
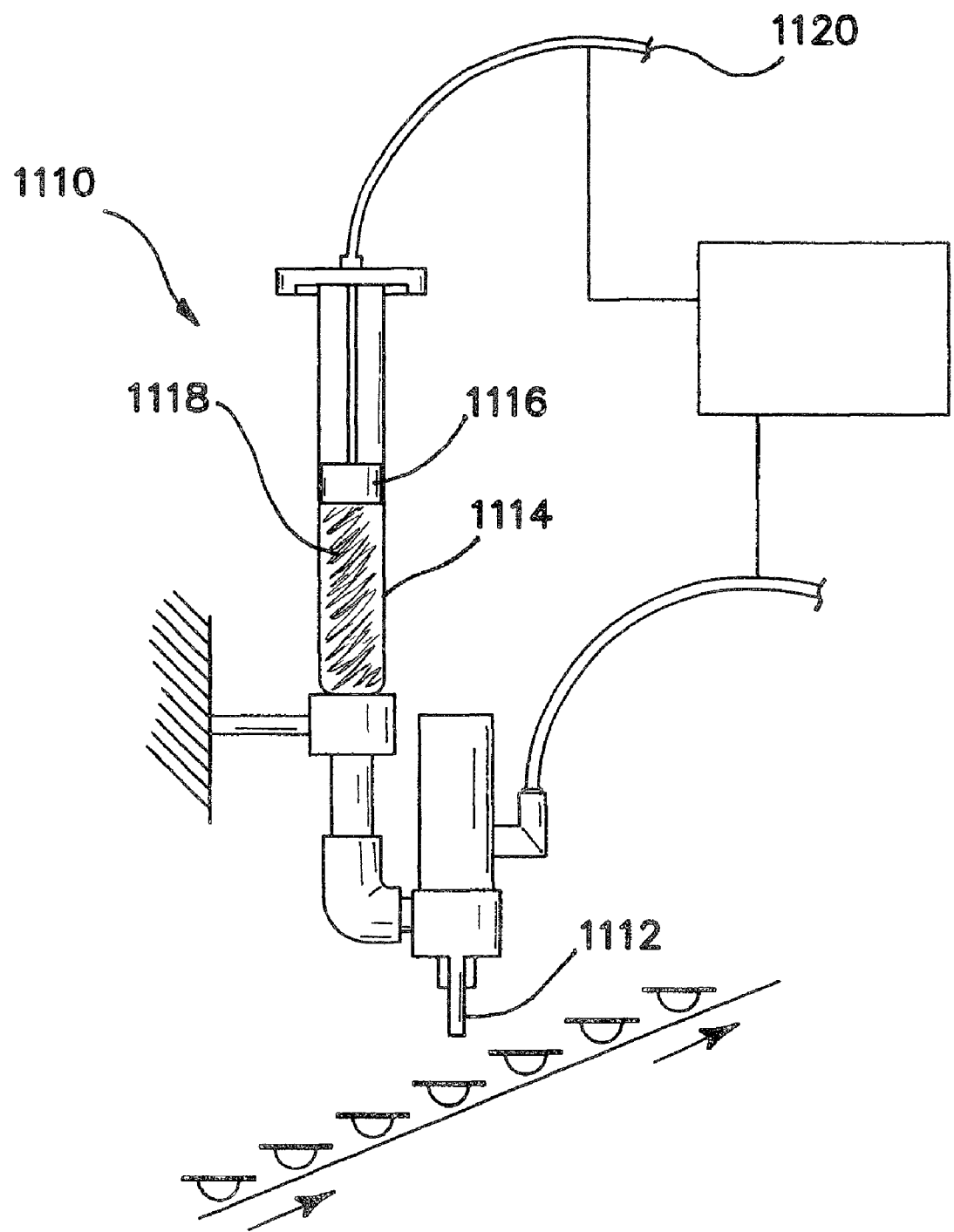
FIG. 4 is an illustration of a lens precursor dispensing apparatus.

As shown in FIG. 1, the method comprises a step 112 of placing a lens precursor composition that comprises at least one silicon-containing monomer on the concave surface of the first mold section. The composition can be placed on the concave surface using any conventional technique or device. However, in certain embodiments, the composition is placed on the concave surface using an automated dispensing apparatus, as shown in FIG. 4. The automated dispensing apparatus 1110 comprises a dispensing tip 1112 and a hollow body 1114 containing the composition 1118. A piston 1116 is located in the body 1114 to direct the composition from the dispensing tip 1112. Movement of the piston 1116 and the dispensing of the composition 1118 can be controlled using a pressurized gas delivered via a pumping device and a conduit 1120. Thus, discrete and reproducible amounts of the composition can be dispensed onto the concave surface.

The lens precursor composition comprises a plurality of monomers which can be polymerized upon exposure to a polymerization source, such as light, heat, and the like. Light sensitive compositions are preferably stored in devices that block or filter ambient polymerizing light to prevent premature polymerization of the composition. The present compositions can also be stored at a controlled temperature, for example about room temperature (e.g., 20-25° C.) using a temperature controller. For example, the body 1114 can be formed of a UV resistant material to prevent or reduce the amount of UV light exposed to the lens precursor composition 1118.

Figure 5:
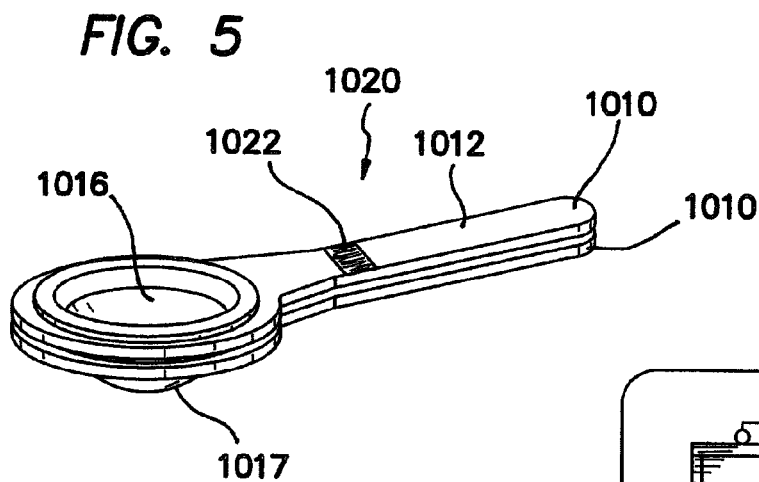
FIG. 5 is a perspective view of a mold assembly formed from two of the mold sections illustrated in FIG. 3.

After placing the lens precursor composition 1118 on the concave surface 1016 of the mold section 1010, the method can comprise a step 114 of placing a second mold section on the first mold section so that the convex surface of the second mold section and the concave surface of the first mold section form a contact lens shaped cavity. The combination of the first mold section and the second mold section located thereon is referred to as a contact lens mold assembly. A contact lens mold assembly 1020 is illustrated in FIG. 5.

Figure 6:
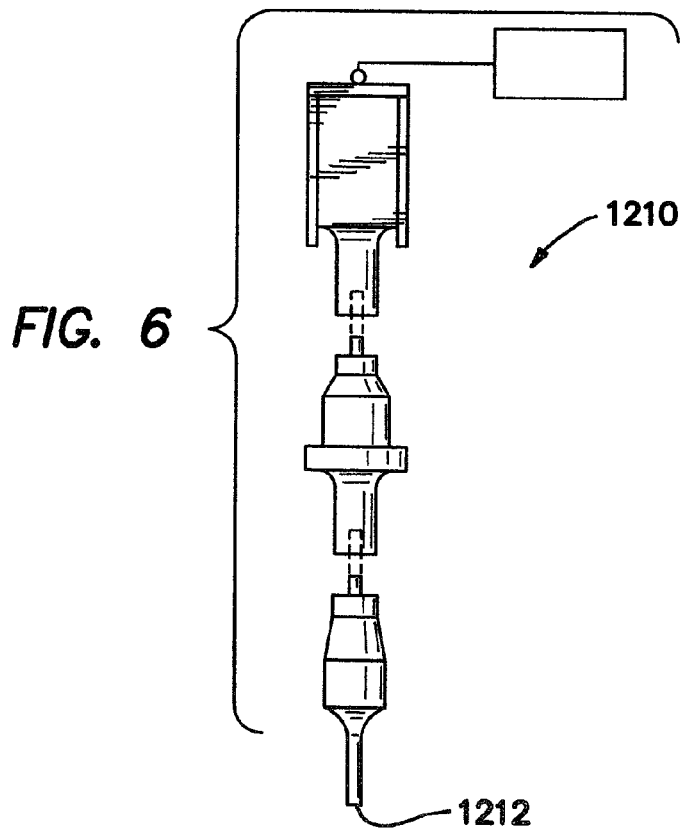
FIG. 6 is an illustration of an ultrasonic welding apparatus.

The first and second mold sections 1010 of the mold assembly 1020 can be held together using a variety of techniques. For example, the mold sections can be held together by pressure applied to opposing plates contacting opposite sides of the mold assembly. Or, the mold sections can be held together by an interference fit between the first mold section and the second mold section. Or, the mold sections can be welded together. Welding appears to provide benefits when the mold sections are formed from EVOH and similar materials. In the illustrated embodiment, the welding of the first mold section and the second mold section to each other can comprise forming a discontinuous ring around the lens forming region of the mold assembly 1020 using an ultrasonic delivery device 1210, as shown in FIG. 6. Any conventional ultrasonic delivery device can be used to deliver ultrasonic energy, such as 40 kHz ultrasonic energy, to the mold assembly. The ultrasonic delivery device 1210 comprises an ultrasound horn 1212 which contacts a mold section of the mold assembly 1020. In one embodiment, in which the mold assembly has contact gaps around the lens forming region, the ultrasound horn 1212 can be a continuous ring ultrasound horn. In embodiments where the mold sections do not have contact gaps, the ultrasound horn may have discrete contact regions for contacting a mold section of the mold assembly to form a discontinuous ring of welding or attachment.

Figure 7:
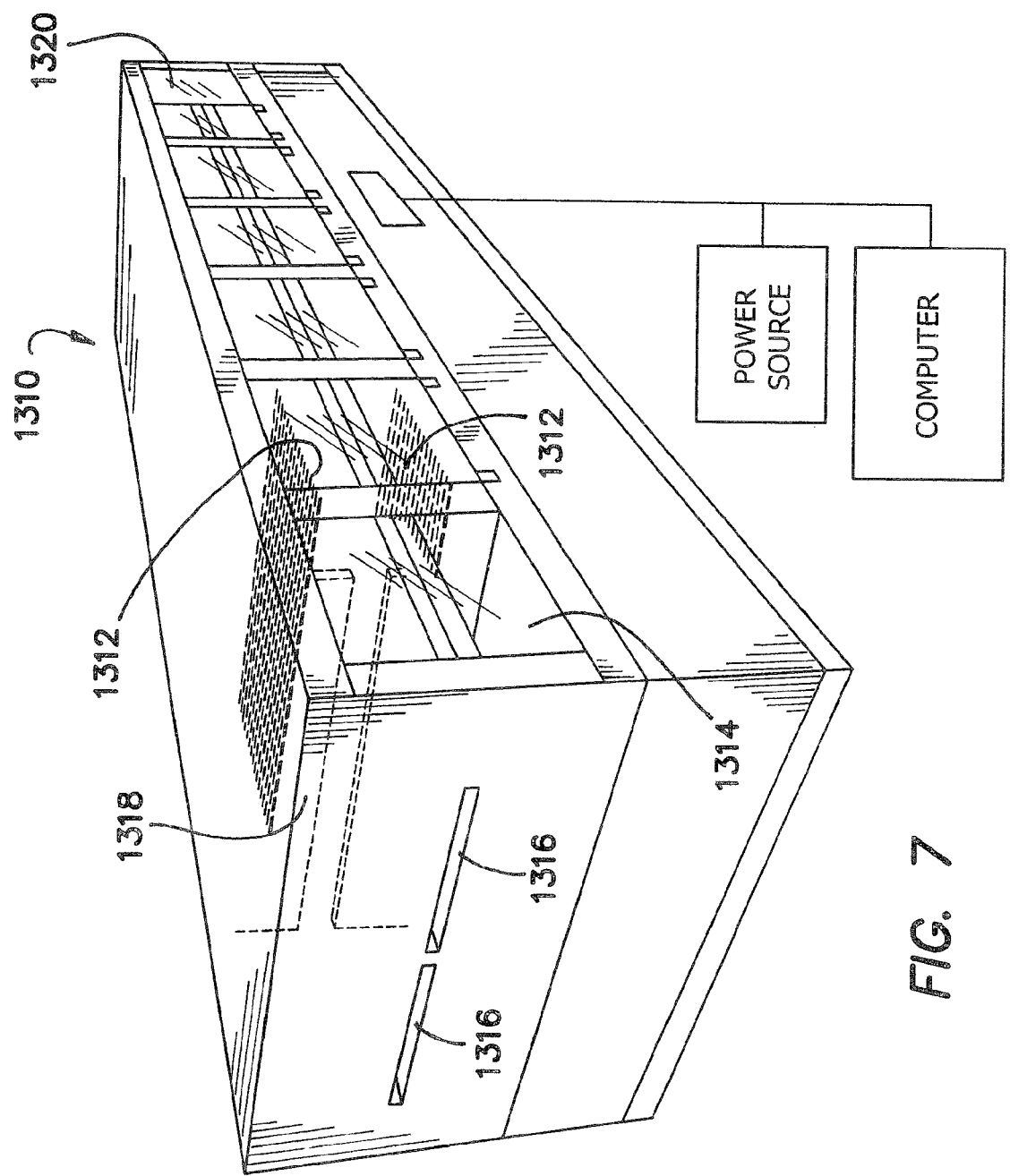
FIG. 7 is a perspective view of a lens precursor polymerization station.

The lens precursor composition can then be polymerized as shown at step 116 in FIG. 1. The polymerization or curing of the lens precursor composition is effective to form a silicone hydrogel contact lens. In the illustrated embodiment, the polymerizing comprises exposing the lens precursor composition to ultraviolet radiation. As shown in FIG. 7, the polymerizing may comprise moving the contact lens, or a plurality of contact lenses, through a housing 1310 which comprises a plurality of ultraviolet lamps 1312 that provide a substantially uniform and substantially constant exposure of the lens precursor composition to the ultraviolet radiation. In the illustrated embodiment, the lamps 1312 are located both above and below the contact lens mold assemblies as the assemblies are exposed to the light. In addition, using the present housing, the compositions are polymerized using lower amounts of ultraviolet radiation than existing polymerization systems. In certain embodiments, the polymerizing comprises exposing the lens precursor composition to an intensity of ultraviolet radiation less than about 1000 $\mu W/cm^2$. For example, the radiation intensity may be about 340±50 $\mu W/cm^2$ to about 900±50 $\mu W/cm^2$. As shown in FIG. 7, two trays carrying a plurality of contact lens mold assemblies can be inserted into an entry vestibule 1314 through openings 1316. A light shield 1318 prevents unwanted premature exposure of the lens precursor composition to UV light emitted from the lamps 1312. The trays are conveyed through the housing 1310 past the lamps 1312 to an exit vestibule 1320, where the trays and mold assemblies can be further processed.

Figure 9:
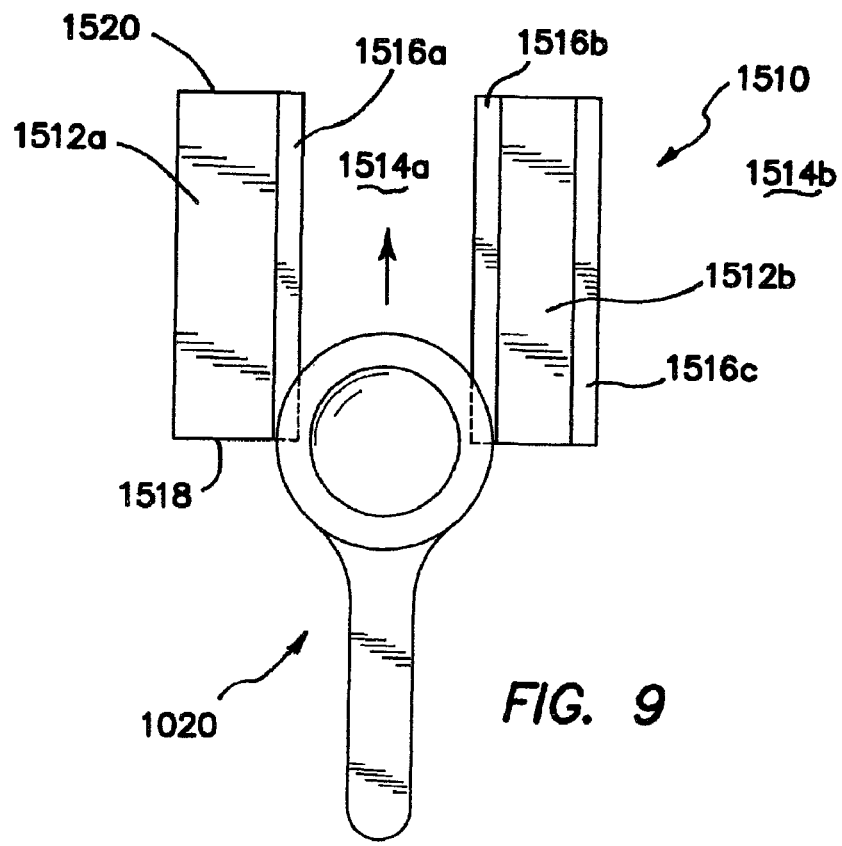
FIG. 9 is a top plan view of a mold assembly being separated by a separation device.

After the lens precursor composition is polymerized, the method may comprise a step 216 of separating the second mold section and the first mold section. In certain embodiments, the separating comprises placing a wedge or other separation device 1510, as shown in FIG. 9, between the first mold section and the second mold section. This may be accomplished by moving a wedge relative to a fixed mold section, or may be accomplished by moving the mold assembly relative to a fixed wedge. In embodiments in which the wedge is linear, the movement is usually linear from a thin region of the wedge to a thicker region of the wedge. In embodiments in which the wedge is circular, such as a disk, the movement may be circular so that the wedge or the assembly rotates about a central axis and causes the first and second mold sections to separate. In certain embodiments, the wedge is unheated. However, in other embodiments, the wedge may be heated to facilitate separation of the mold sections. Alternatively, the wedge may be cooled. Additional embodiments may employ a laser cutting knife to separate the mold sections.

As shown in FIG. 9, a mold assembly separation device is illustrated at 1510. The device 1510 comprises a first separator 1512a and a second separator 1512b. The first separator 1512a and the second separator 1512b are spaced apart to form a mold assembly track 1514a. The mold assembly 1010 can be moved along the track 1514a in the direction of the arrow to separate the two mold sections of the mold assembly. The first separator 1512a comprises a wedge 1516a. Similarly, the second separator 1512b comprises a wedge 1516b. In addition, the second separator 1512b comprises a second wedge 1516c, and can be used to form a side of a second track 1514b with a third separator (not shown).

Figure 10:
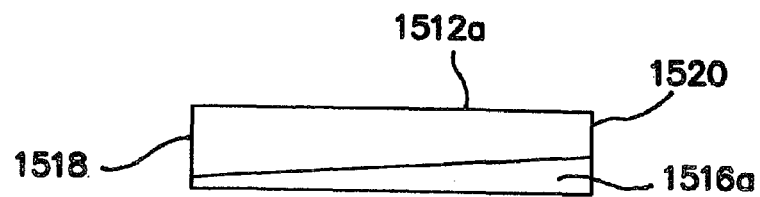
FIG. 10 is a side plan view of one of the separators of FIG. 9.

As shown in the side view of FIG. 10, the first wedge 1516a is tapered along the length of the separator 1512a. For example, the wedge 1516a has a small thickness, such as a knife edge, at the first end 1518 of the separator 1512a, and a relatively greater thickness at the second end 1520 of the separator 1512a. The wedge progressively increases in thickness along the length of the separator. In certain embodiments, the thickness may remain constant (i.e., not tapered) at a portion of the separator near the second end 1520. Wedges 1516b and 1516c are substantially identical in structure to wedge 1516a.

To separate the mold sections of the mold assembly 1020, the mold assembly 1020 contacts the wedges 1516a and 1516b between the two mold sections of the mold assembly. The mold assembly 1020 moves relative to the wedges 1516a and 1516b until the second mold section is separated from the first mold section due to the stress caused by the progressively increasing thickness of the wedges. Alternatively, the separators could be moved relative to the mold assembly if desired.

In certain embodiments, the present methods may comprise a step of contacting the silicone hydrogel contact lens with a liquid to detach the lens from a surface of the separated mold section. For example, a contacting step may comprise placing the mold section containing the polymerized contact lens in a volume of water. The water, or other suitable liquid, causes the lens to swell or expand and become detached from the surface of the mold section. Although the swelled lens is detached from the surface, it is still retained in the lens shaped region of the mold section due to the concave shape of the lens region of the mold section.

After the mold sections are separated, the method comprises a step 120 of removing the silicone hydrogel contact lens from the mold section, as shown in FIG. 1. The contact lens may adhere selectively to the first mold section (e.g., the concave surface of the lens forming region) or to the second mold section (e.g., the convex surface of the lens forming region). In the illustrated embodiment, the lens remains attached to the concave surface of the first mold section. In certain embodiments, it may be desirable to cool the mold section to which the contact lens is to adhere. For example, a method may comprise a step of cooling the first mold section to cause the contact lens to adhere to the first mold section when separated from the second mold section.

Figure 11:
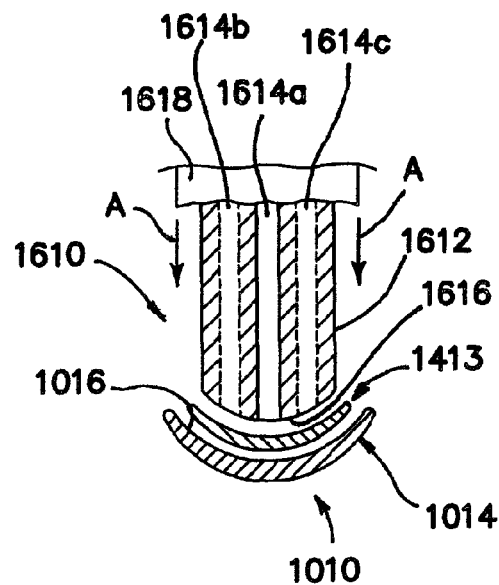
FIG. 11 is a sectional view of a silicone hydrogel contact lens being removed from a mold section using a vacuum apparatus.

The removing 120 of the present methods may comprise a step of applying negative pressure to a surface of the contact lens using a vacuum apparatus to separate the contact lens from the mold section. More specifically, and as shown in FIG. 11, a vacuum apparatus 1610 which comprises a vacuum head 1612 with a plurality of holes 1614a, 1614b, and 1614c can be placed adjacent or near a surface of the contact lens 1413. Reducing the pressure in the vacuum head 1612 through the holes 1614a, 1614b, and 1614c causes the lens 1413 to become attached to the vacuum head 1612 and be removed from the surface 1016 of the lens region 1014 of the mold section 1010. The method may also comprise a step of displacing the contact lens from the surface of the vacuum apparatus onto a tray. In other words, the contact lens can be removed from the vacuum head surface 1616 and placed in a tray for further processing. In certain embodiments, the displacement is accomplished by relieving the vacuum pressure delivered by the vacuum head 1612. In additional embodiments, the vacuum head 1612 may include an air delivery device 1618 structured to deliver a column of air along the vacuum head (as shown by arrows A) to facilitate displacement of the contact lens 1413. The column or shroud of air is useful in preventing the soft silicone hydrogel contact lens from folding and/or moving along the vacuum head during the displacement.

As shown in FIG. 1, after removing the contact lens from the mold section, the method comprises extracting 122 extractable components from the silicone hydrogel contact lens. Extractable components refer to components of the polymerized lens that can be removed to make the lens more ophthalmically compatible compared to lenses that contain extractable components. Typically, the extractable components are unreacted or unpolymerized monomers from the lens precursor composition. Because certain extractable components are organic, it may be desirable to use one or more organic solvents. Thus, the present methods may comprise a step of placing the contact lens (or lenses) in a volume of organic solvent. Examples of suitable organic solvents include methanol, ethanol, propanol, and the like, and combinations thereof. In one embodiment, the organic solvent comprises a blend of methanol and ethanol (i.e., industrial methylated spirits (IMS)). In certain embodiments, the present methods may comprise a step of recycling the organic solvent used to extract the extractable components. This is in contrast to existing systems which dispense of the organic solvent after an extraction procedure.

Figure 12:
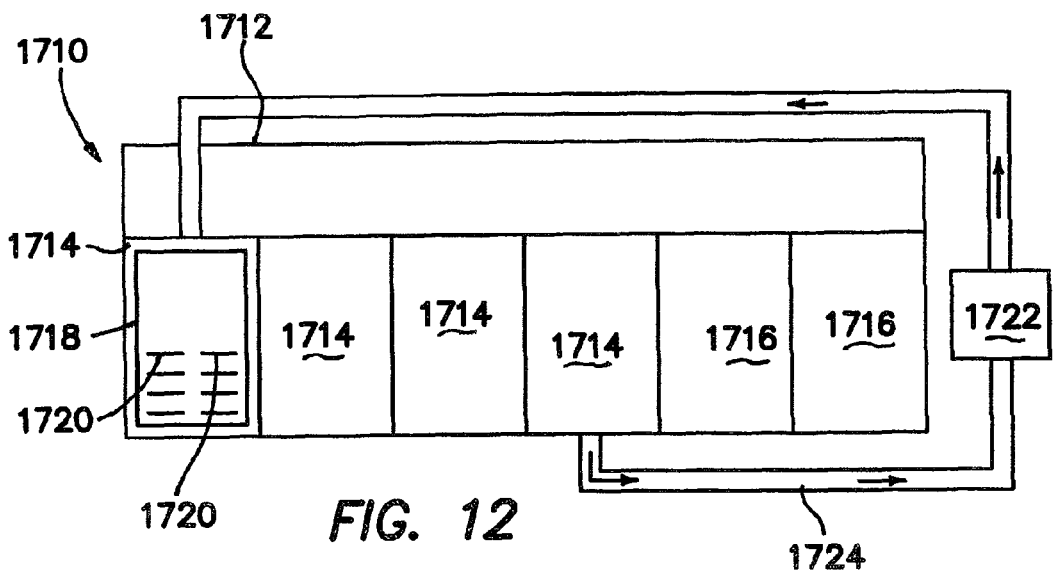
FIG. 12 is an illustration of an extraction/hydration system to process silicone hydrogel contact lenses.

As shown in FIG. 12, an extraction system 1710 comprises a housing 1712. The housing 1712 comprises a plurality of extraction stations 1714 and a plurality of hydration stations 1716. A carrier 1718 which comprises a plurality of trays 1720 containing polymerized silicone hydrogel contact lenses is shown in the left most extraction station 1714. The extraction stations 1714 contain an extraction medium, such as different concentrations of IMS, to extract extractable components from the silicone hydrogel contact lenses. The carrier 1718 with the trays 1720 of lenses is transferred from one station to another station during the extraction procedure. After extraction, the carrier is transferred to one hydration station 1716 which contains water, and then a second hydration station 1716 which also contains water. Optionally, one or more of the hydration stations can be located out of the housing 1712.

As shown schematically, extraction media from any of the extraction stations 1714 can be directed through a conduit 1724 for recycling. The media may be passed through one or more filtration devices and/or other processing devices 1722 before being added back into any one of the extraction stations 1714 for further use. Thus, the present extraction system can provide substantial reduction in expenses compared to other systems which discard the extraction media.

After the extraction step or steps, the method may comprise a step 124 of placing the silicone hydrogel contact lens in an aqueous medium to hydrate the lens. For example, the contact lens or lenses may be placed in deionized water and the like to saturate the lens or swell the lens. As discussed above, this can occur in the housing 1712 or separately.

Optionally, the present methods may comprise inspecting the contact lens for defects, such as tears, surface irregularities, chips, and the like. The inspection can be performed manually using a magnifying instrument, or can be automated using a computer, digital camera, and software to detect lens defects. The lenses can be inspected either in a volume of liquid, or on a planar surface without a body of liquid.

Figure 8:
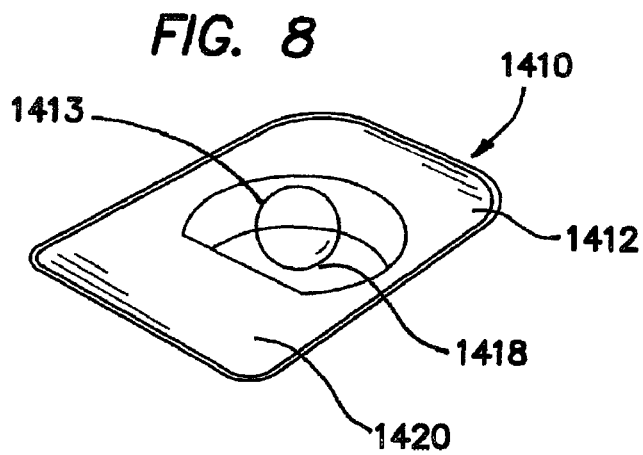
FIG. 8 is an illustration of a lens package containing a silicone hydrogel contact lens.

After the optional step of inspection, the present lenses can be placed into a sealable package, such as the package 1410 shown in FIG. 8. The package 1410 comprises a hydrophobic material, such as a polyolefin based material. For example, the package 1410 may be a polypropylene blister pack. As shown in FIG. 8, the package 1410 comprises a base member 1412 that comprises a cavity 1418 containing a liquid medium (not shown), such as phosphate buffered saline and the like. A silicone hydrogel contact lens 1413 is located in the liquid medium. The package 1410 also comprises a flange 1420 extending from the cavity 1418, which is grippable by a person attempting to remove the contact lens 1413 located therein.

Advantageously, the present silicone hydrogel contact lenses 1413 can be placed in a hydrophobic package and not adhere to a surface of the package without requiring the presence of a surfactant or surface modification of the package. In addition, the present lenses do not require a surface modification or surface treatment to make the contact lens surfaces wettable.

As shown in FIG. 3, the mold sections 1010 may comprise an identifier 1022, such as a computer readable identifier. The present methods may thus comprise a step of tracking the mold sections by scanning the identifier. Preferably, each batch of mold sections has a unique identifier to permit the lenses and mold sections to be properly tracked and accounted during the methods disclosed herein.

Figure 2:
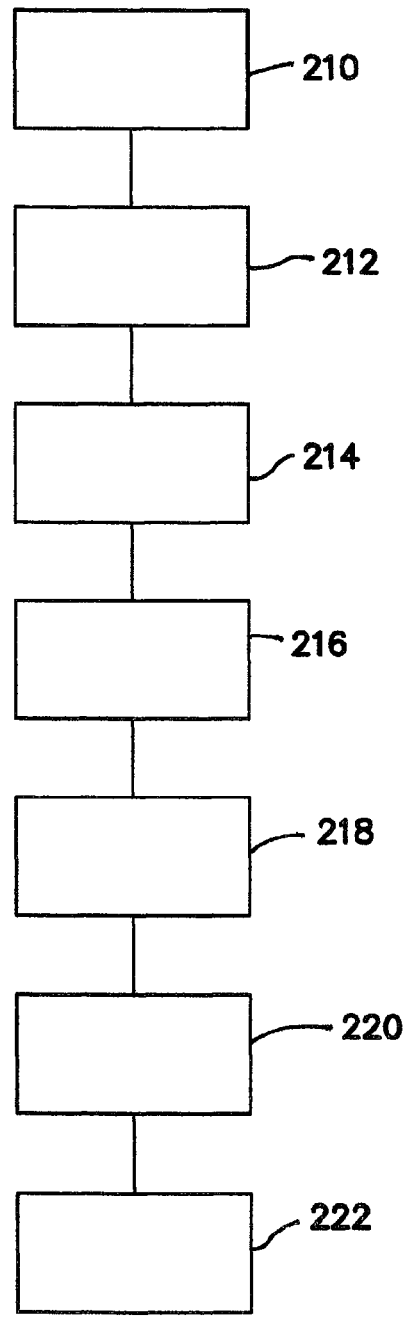
FIG. 2 is a schematic of a contact lens production system.

As shown schematically in FIG. 2, a general system for producing the present contact lenses comprises multiple stations or modules. For example, the system 200 comprises a molding station 210, a mold filling and closing station 212, a curing or polymerization station 214, a lens separation station 216, an extraction/hydration station 218, an inspection station 220, and a packaging station 222. The various stations can be arranged and/or combined to produce the present contact lenses in any desirable manner. Details of the various stations can be understood from the description of FIGS. 3-12 herein.

Some aspects of other systems and methods of producing contact lenses are disclosed in the following U.S. Patents and Patent Publications: 6,592,356; 5,540,410; 5,759,318; 5,593,620; 5,597,519; 6,359,024; 2003/0090014; 5,850,107; 5,820,895; 5,935,492; 5,836,323; 6,288,852; 6,531,432; and 2005/0171232.

Certain aspects and advantages of the present invention may be more clearly understood and/or appreciated with reference to the following commonly owned United States Patent Applications, filed on even date herewith, the disclosure of each of which is being incorporated herein in its entirety by this specific reference: U.S. patent application Ser. No. 11/200,848, entitled "Contact Lens Molds and Systems and Methods for Producing Same"; U.S. patent application Ser. No. 11/200,648, entitled "Contact Lens Mold Assemblies and Systems and Methods of Producing Same"; U.S. patent application Ser. No. 11/200,644, entitled "Systems and Methods for Producing Contact Lenses from a Polymerizable Composition"; U.S. patent application Ser. No. 11/201,410, entitled "Systems and Methods for Removing Lenses from Lens Molds"; U.S. patent application No. 11/200,863, entitled "Contact Lens Extraction/Hydration Systems and Methods of Reprocessing Fluids Used Therein"; U.S. patent application Ser. No. 11/200,862, entitled "Contact Lens Package"; and U.S. patent application Ser. No. 60/707,029, entitled "Compositions and Methods for Producing Silicone Hydrogel Contact Lenses".

A number of publications and patents have been cited hereinabove. Each of the cited publications and patents are hereby incorporated by reference in their entireties.

While this invention has been described with respect to various specific examples and embodiments, it is to be understood that the invention is not limited thereto and that it can be variously practiced within the scope of the following claims.

What is claimed is:

1. A method for producing a non-surface treated wettable silicone hydrogel contact lens, comprising:

forming a plurality of mold sections from a polymer-based material, said mold sections comprising a first mold section having a first lens forming region including an optical quality concave surface, and a second mold section having a second lens forming region including an optical quality convex surface, wherein each of the lens forming regions of the mold sections includes the polymer-based material;

placing a lens precursor composition that comprises at least one silicon-containing monomer on the optical quality concave surface of the first mold section;

placing the second mold section on the first mold section so that the optical quality convex surface of the second mold section and the optical quality concave surface of the first mold section form a contact lens shaped cavity;

welding the second mold section and the first mold section together to form a welded contact lens mold assembly; thereafter polymerizing the lens precursor composition in the contact lens shaped cavity to form a silicone hydrogel contact lens;

separating the second mold section and the first mold section of the welded contact lens mold assembly comprising placing a wedge, having a knife edge, between the first mold section and second mold section to separate the second mold section from the first mold section;

contacting the silicone hydrogel contact lens with a liquid to detach the lens from a surface of the mold section;

removing the detached silicone hydrogel contact lens from either the first mold section or the second mold section, the removing step comprising applying negative pressure to a surface of the detached silicone hydrogel contact lens retained on the mold section using a vacuum apparatus to separate the contact lens from the mold section;

displacing the silicone hydrogel contact lens from a surface of the vacuum apparatus onto a tray;

extracting extractable components from the silicone hydrogel contact lens; and placing the silicone hydrogel contact lens in an aqueous medium to hydrate the silicone hydrogel contact lens, wherein the hydrated silicone hydrogel contact lens is free of a surface treatment and has wettable surfaces.

2. The method of claim 1, wherein the polymer-based material is effective in forming a silicone hydrogel contact lens having, when hydrated, wettable surfaces without surface treatment.

3. The method of claim 1, wherein the polymer-based material is an ethylene-vinyl alcohol polymer-based material.

4. The method of claim 1, wherein the step of forming the plurality of mold sections comprises injection molding the polymer-based material to form a plurality of injection molded mold sections.

5. The method of claim 4, wherein the step of injection molding the polymer-based material to form the plurality of injection molded mold sections comprises injection molding the first lens forming region of the first mold section to form an injection molded optical quality concave surface, and injection molding the second lens forming region of the second mold section to form an injection molded optical quality convex surface.

6. The method of claim 1, wherein the step of forming the plurality of mold sections comprises forming a plurality of mold sections that are all substantially identical in structure.

7. The method of claim 1, wherein the forming of the mold sections comprises forming an elongate member extending from the lens forming region.

8. The method of claim 1, wherein the welding comprises forming a discontinuous ring around the contact lens shaped cavity using an ultrasonic delivery device.

9. The method of claim 1, wherein the polymerizing comprises exposing the lens precursor composition to ultraviolet radiation.

10. The method of claim 9, wherein the polymerizing comprises moving the contact lens mold assembly through a housing comprising a plurality of ultraviolet lamps which provide a substantially uniform and substantially constant exposure of the lens precursor composition to the ultraviolet radiation.

11. The method of claim 1, wherein the polymerizing comprises exposing the lens precursor composition to ultraviolet radiation emitted from a lamp at an intensity less than about 1000 $\mu W/cm^2$.

12. The method of claim 1, further comprising directing a column of air along the vacuum apparatus to facilitate displacement of the silicone hydrogel contact lens from the vacuum apparatus surface.

13. The method of claim 1, wherein the extracting comprises placing the silicone hydrogel contact lens in a plurality of volumes of organic solvent.

14. The method of claim 1, further comprising inspecting the silicone hydrogel contact lens for defects.

15. The method of claim 1, further comprising placing the silicone hydrogel contact lens in a sealable package comprising a hydrophobic material.

16. The method of claim 1, wherein each of the mold sections includes an identifier, and the method further comprises tracking the mold sections by scanning the identifier.

17. The method of claim 1, further comprising cooling the first mold section to cause the silicone hydrogel contact lens to adhere to the first mold section when separated from the second mold section.

18. The method of claim 1, further comprising contacting the silicone hydrogel contact lens in the first mold section with water after the second mold section has been separated from the first mold section.

19. The method of claim 1, further comprising recycling an organic solvent used to extract the extractable components from the silicone hydrogel contact lens.

20. The method of claim 1, wherein each of the plurality of mold sections is substantially identically structured and comprises both first and second lens forming regions comprising optical quality concave and convex surfaces, respectively.

21. The method of claim 1, wherein the welding comprises forming a plurality of discrete welded zones to form a discontinuous ring of welding.

* * * * *